United States Patent

[11] 3,590,248

| [72] | Inventor | Edward J. Chatterton, Jr. |
| --- | --- | --- |
| | | Lexington, Mass. |
| [21] | Appl. No. | 447,734 |
| [22] | Filed | Apr. 13, 1965 |
| [45] | Patented | June 29, 1971 |
| [73] | Assignee | Massachusetts Institute of Technology |
| | | Cambridge, Mass. |

[54] LASER ARRAYS
16 Claims, 7 Drawing Figs.

[52] U.S. Cl. ................................... 250/199,
331/94.5, 350/96
[51] Int. Cl. .................................... H04b 9/00
[50] Field of Search .......................... 250/199,
83.3, 205, 206, 208, 209, 220, 219, 219.4;
331/94.5; 330/59, 4.3; 178/5.6, 6, 6.6; 179/15;
328/231; 350/96, 150, 151, 152, 157, 160, 161,
162, 166, 169, 174; 88/1

[56] References Cited
UNITED STATES PATENTS

| 3,187,627 | 6/1965 | Kapany | 88/1 LCR |
| --- | --- | --- | --- |
| 3,289,101 | 11/1966 | Masters | 88/1 LCR |
| 3,391,281 | 7/1968 | Eerkens | 250/199 |
| 1,780,364 | 11/1930 | Reynolds | 178/6 LCR |
| 2,967,910 | 5/1955 | Wilson | 179/15 AM |
| 3,043,179 | 7/1962 | Dunn | 350/169 |
| 3,248,669 | 4/1966 | Dumke | 331/94.5 |
| 3,284,722 | 11/1966 | Gray | 331/94.5 |
| 3,290,539 | 12/1966 | Lamorte | 331/94.5 |
| 3,294,903 | 12/1966 | Goldmark | 178/6 LCR |
| 3,310,681 | 3/1967 | Hargens | 178/6 LCR |
| 3,349,174 | 10/1967 | Warschauer | 250/199 |

FOREIGN PATENTS

| 675,357 | 7/1952 | Great Britain | 350/169 |
| --- | --- | --- | --- |

Primary Examiner—Robert L. Griffin
Assistant Examiner—Albert J. Mayer
Attorneys—Melvin R. Jenney, Richard R. Hildreth, Edward D. Thomas, Robert J. Horn, Jr., Robert T. Dunn and Thomas Cooch ABSTRACT: Radiation from a semiconductor laser which radiates from a relatively small area of the semiconductor is directed to a target by a bundle of light conducting tubes or fibers, such that substantially all of the fibers in the bundle actively conduct the radiation from the laser, the bundle being formed by selecting from a larger bundle of fibers which abuts the semiconductor only those fibers which actively conduct the laser radiation.

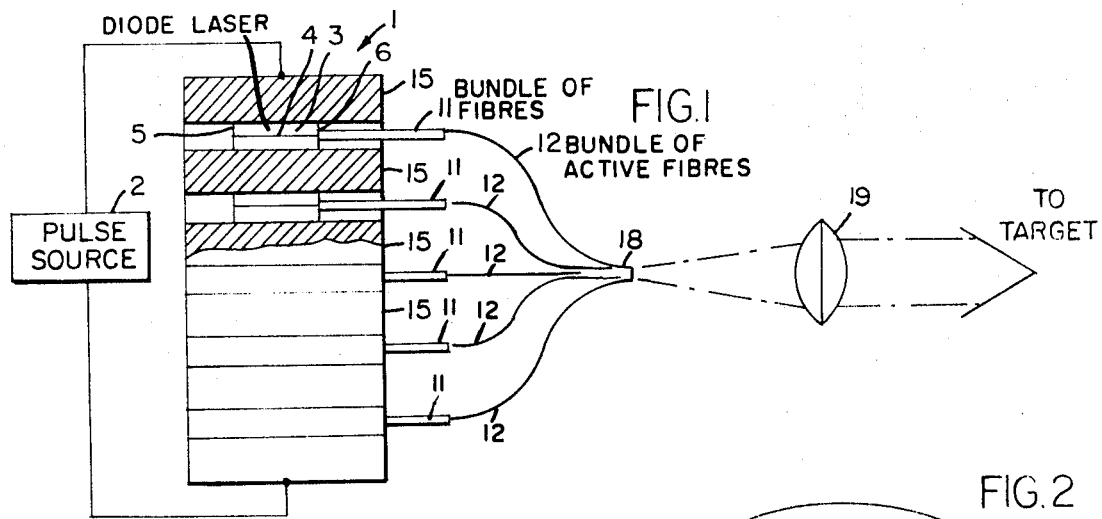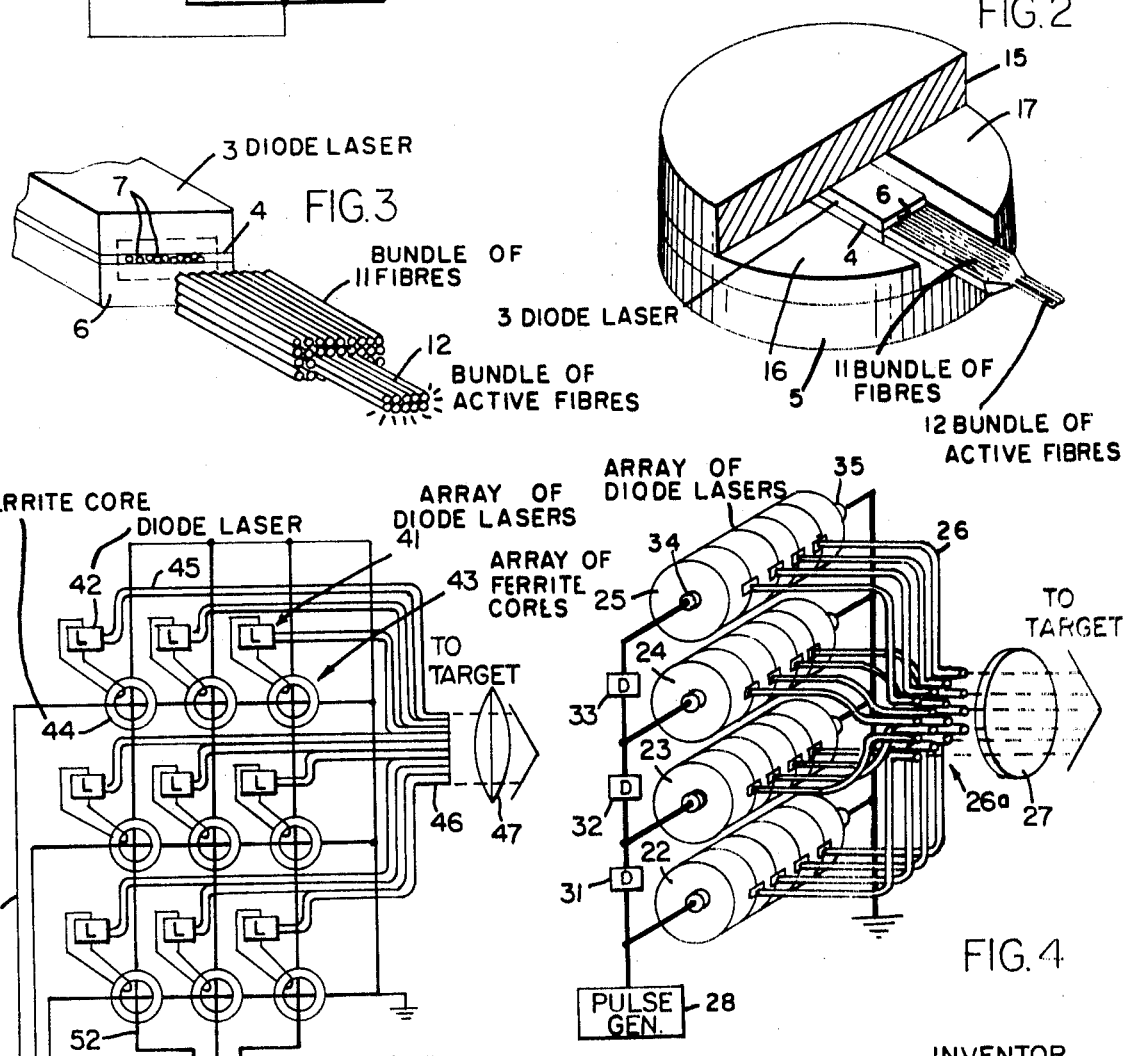

INVENTOR
EDWARD J. CHATTERTON JR.

LASER ARRAYS

This invention relates to laser devices, and more particularly to means for combining the intense radiation from a multitude of laser devices and for directing the combined radiation to targets.

Semiconductor lasers such as the injection diode laser have many desirable features, such as specifically designable wavelengths of high purity, ease and efficiency of modulation, potentially low cost and high radiant emittance. However, in the typical injection diode laser, the laser activity arises at the junction of the diode which is a very thin layer only a few microns thick, and, thus, the volume of the area in which the laser activity arises is very small, and is considered to have only two dimensions. Other types of lasers such as the ruby laser radiate from relatively large three-dimensional bulk volume and so the radiant power from these is substantially greater than from the injection diode lasers. It is one object of the present invention to provide means for combining the radiation from a multitude of semiconductor lasers so as to produce greater radiant power and thus extend the limits of application of such a laser.

Techniques have been proposed for causing the coherent beam of radiation from a laser to scan in space; some of the most promising of these techniques include electro-optical devices such as birefringent calcite crystals that split the incident laser radiation into ordinary and extraordinary rays. These rays are directed to an electro-optical switch which controls the polarization direction of the radiation. The switch may consist of, for example, a potassium dihydrogen phosphate crystal which makes use of the longitudinal electro-optical Pockles effect and which selectively transmits the ordinary or the extraordinary rays depending on the energization of the switch. Since the ordinary and extraordinary rays are displaced from each other by a distance proportional to the length of the birefringent crystal, the effect of the switching action is to displace the incident laser radiation and so the laser beam is switched from one spatial position to another. A suitable lens system directs the beam from one area of a target to another area of the target or to a second target. One disadvantage of this technique is that the ordinary and the extraordinary rays are of substantially different intensity and the greater the amount of the displacement which is produced by the switching action, the greater will be the ratio of intensities of the two rays. It is another object of the present invention to provide means for producing an intense laser beam of substantially the same intensity at any of a multitude of different spatial positions, the rate of switching from one position to another being comparable with that of the prior devices such as the one mentioned above.

It is another object to provide means for combining the coherent radiation from a plurality of laser devices and for displacing said radiation from one spatial position to another at rates comparable to those of prior devices such as described above.

It is another object of the present invention to provide an intense beam of radiation from laser sources with means for selectively combining the radiation from any selected combinations of said sources so that the combined radiation may be varied over a relatively broad band of frequencies.

It is another object of the present invention to provide a wide spectrum source of intense laser radiation.

In accordance with a feature of the present invention, a bundle of radiation-conducting tubes or fibers is disposed abutting one of the optical faces of a semiconductor laser such as a GaAs diode laser. During operation, only certain spots in the plane of the diode junction become active and produce the intense laser radiation which emerges from the optical face and is conducted by one or more of the fibers in the bundle. Thus, only certain fibers in the bundle are active and conduct the intense laser radiation. These active fibers are selected and combined together to form a second substantially smaller bundle and the inactive fibers in the original bundle are cut off. The cross section area of the second active bundle of fibers is preferably of the same order of magnitude as the cross section of the active lasering area of the diode junction.

Various embodiments of the present invention include the above feature to select and combine the active lasering areas from a multitude of diode junction lasers. In some embodiments, the active bundle of fibers from each of the diode lasers are combined to form a single bundle of fibers in which substantially all the fibers are active, and, thus, the active radiating areas of a multitude of diode lasers are combined to produce a very intense beam of directional radiation. In another embodiment, the active fiber bundles from each of the plurality of diode lasers are disposed with relationship to each other in an ordered spatial orientation and the individual diode lasers are energized in a regulated manner so that the radiation issuing from the active bundles of fibers produces a beam of intense laser radiation which is caused to shift in spatial position depending upon the spatial positions of the active bundles and the sequence of energization of the individual diode lasers. One use of the latter embodiment is to produce a laser beam which sweeps a target in a regulated pattern, the intensity of radiation directed to the target being of at least the same order of magnitude of the radiation power emitted by one of the laser devices. This embodiment, it will be noted, is a laser time-multiplex system as well as a beam scan system. The beam scan feature can be eliminated by collecting the active fiber bundles into a single bundle of closely spaced active fibers to produce a substantially stationary time-multiplexed laser beam. In this case, the individual diode lasers would be energized in response to time-multiplexed information signals.

Numerous applications of the present invention arise wherein the bundles of active fibers from a multitude of diode lasers are combined in as close spatial orientation as possible to provide a single bundle including all active fibers from the multitude of diode lasers. One use of this is to produce a very intense beam of radiation which can be directed to a target to accomplish any of a variety of results. For example, if the fibers are between 10 and 20 microns in diameter, it would typically require about 10 such fibers to carry radiation from the active area of the diode junction and these active fibers could be arranged in a bundle about 30 to 60 microns in diameter even though the filaments of laser radiation may be spread along a 200-micron length of the diode junction. Thus, by combining the active fibers into a single active bundle, at least one dimension of the source of radiation is reduced without substantial reduction in the power of radiation. This feature is employed in a number of embodiments. In one such embodiment, a number of different types of diode lasers producing different bands of radiation are employed. Each diode laser is energized from a different source in accordance with information signals and, as a result, the waveband of the radiation from the combined bundle is coded in accordance with the information signal. This embodiment is a laser wavelength-multiplex system.

In another embodiment, similar to the wavelength-multiplex system, different groups or arrays of the diode lasers are energized at different RF frequencies, each of which carries information. Thus, the information is transmitted by an RF frequency multiplex signal carried by the intense laser radiation.

Other features and objects of the present invention are apparent from the following specific description taken in conjunction with the figures in which;

FIG. 1 is a partially sectional view of a stack arrangement or linear array of diode lasers, each including a bundle of radiation conducting fibers adjacent one optical face thereof, selected active fibers from each of the bundles being combined to form a single bundle of all active fibers for launching radiation to a target;

FIG. 2 is a detailed sectional view of one of the diode laser elements forming the stack of FIG. 1;

FIG. 3 illustrates the relative orientation of a typical one of the diode lasers and fiber bundles;

FIG. 4 illustrates an embodiment of the invention employing a plurality of diode lasers with active bundles of fibers issuing from each and arranged in an orderly array so that when the diodes are energized in sequence, the radiation issuing from the bundles is caused to sweep a target;

FIG. 5 illustrates a laser wavelength-multiplex system including a plurality of different types of diode lasers which are energized in accordance with coded or information signals from a number of channels so that the combined bundle of active fibers attached to the diode lasers simultaneously launches radiation to a target of different wavelength each of which identifies a different channel;

Figure 6:
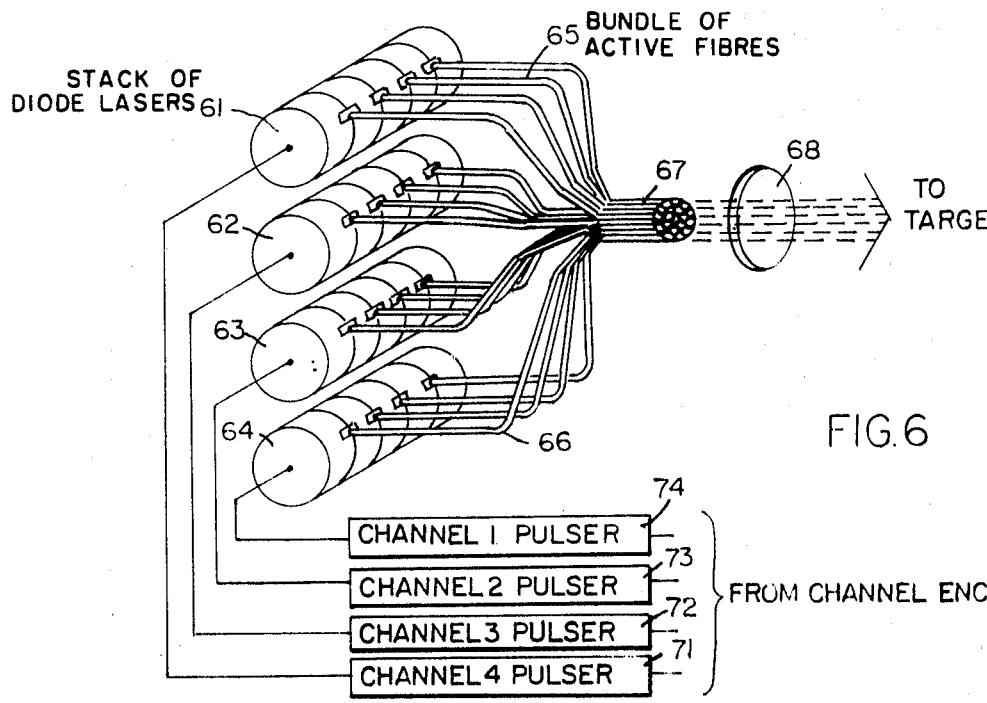
FIG. 6 illustrates a laser time or pulse-multiplex system in which the different channels are identified at the target by distinguishing different pulse rates.

Turning first to FIG. 1, there is shown a linear array 1 of diode injection lasers arranged in a stack and energized by current pulses from a source 2. Each of the diodes such as diode 3 consist of a thin chip of semiconductor material such as, for example, GaAs in which a diode junction 4 is formed by any of the techniques well known in the art. Optically parallel faces 5 and 6 are provided on each of the chips to define an optical cavity enclosing the junction plane and substantially transverse thereto. Thus, the axis of the cavity is coincident with the plane of the junction 4 so that coherent radiation from filaments produced at the junction when the diode is energized emerges from at least one of the optical faces such as face 6. Typical filaments of radiation as subtended by the optical face 6 are shown as spots 7 in FIG. 3.

A bundle 11 of 10- to 20-micron diameter glass fibers are disposed normal to the optical face 6 of the diode. In some applications, it is desirable to fuse together the fibers in the bundle adjacent the face 6 and to cement this end of the bundle directly to the face 6 of the diode. The cross section area of the end of the bundle 11 is substantially greater than the active cross section area of the junction and is preferably of the same order of magnitude as the cross section of the diode chip. Thus, all laser radiation produced in the junction and concentrated in the filaments 7 is gathered by the bundle 11 and is conducted by active fibers 12 in the bundle.

The junction 4 of the GaAs diode is generally about 10 microns thick and the width of this junction is about 0.01 inches. As is well known, during operation, only certain spots on the optical face 6 of the junction transmit laser radiation because the laser radiation is generated in narrow filaments across the junction. These spots corresponding to the filaments are denoted 7 in FIG. 3. The active spots may extend along as much as two-thirds the total junction width and so the active area of the junction, as subtended by the optical face 6, may be about 10 microns by 0.006 inches or a total area of about 1,500 microns square.

After fabrication of the diode and connection of the diode optical face with the bundle of fibers, the active fibers are selected with the aid of image converters or other suitable detectors and the inactive fibers in the bundle are cut off so that a smaller bundle of all active fibers such as bundle 12 is formed. It is preferable that the cross section area of these active fibers be somewhat larger than the active area of the junction, for example about 2,000 microns squared. The radiation which issues from the active bundle 12 leaves each fiber of that bundle ideally at the angle of incidence of radiation entering the fiber adjacent the face 6 of the diode. The radiation from a typical GaAs injection diode laser is an irregular beam pattern of approximately 10°. The wide angle results from diffraction from the 10-micron diameter filaments in the active junction region. If fibers of 10 microns in diameter are employed, further broadening of the beam by diffraction is not appreciable because the fibers are about the same size as the thickness of the active region. If smaller fibers are employed, there will result more efficient interception and propagation of the radiation, however, it will result in a greater beam broadening.

The embodiment illustrated in FIG. 1 includes a number of injection diode lasers stacked together between copper wafers 15. Also disposed between the copper wafers on each side of the diode laser are semicircular wafers of insulating material 16 and 17 which may be fabricated of GaAs. A bundle of fibers such as bundle 11 extends from each of the diodes and from each of these bundles are selected the bundle of active fibers such as bundle 12. All of the bundles of active fibers are combined together to form an output bundle 18 from the stack of diodes as shown in FIG. 1. The radiation emanating from the output bundle 18 is directed by a suitable optical system 19 to a target.

A number of compromising considerations are made in a system such as illustrated in FIG. 1 and depend upon the use that is made of the system. For example, they depend upon the distance to the target and the amount of beam broadening that is permitted in view of the purpose of illuminating the target. A practical design of such a system seeks the best compromise between efficiencies of collection and conduction by the fiber bundles, the required F number of the optical system 19, the number of fiber bundles that can be accommodated in view of the beamwidth of the system and the equivalent lens diameter of the optics. Each use of such a system requires detailed consideration. Approximately 70 percent of the light incident on the fiber bundles is transmitted by the bundles and approximately 10 percent of this is lost in the fibers. Thus, overall transmission efficiency to an F/5.6 optic system is better than 57 percent. In view of this estimated minimum 57 percent transmission efficiency of the fiber optics, radiant power from various arrays of diode lasers can be computed for several practical telescope sizes and this can be compared with the radiant power from a single diode laser. The tabulation below shows the relationships between desired beam width, several practical telescope sizes and the maximum permissible number of diode lasers in the array.

| Primary optics diameter, f/5.6 system | 0.5 mrad, diodes | Beam-width 0.2 mrad | 0.1 mrad |
|---|---|---|---|
| Inches: | | | |
| 6 | 71 | 11 | 3 |
| 16 | 510 | 81 | 20 |
| 48 | 4,585 | 735 | 183 |

As can be seen, the above table contemplates arrays including hundreds and even thousands of diode lasers. Some electrical and thermal problems arise when such large numbers of diode lasers are arranged in an array of relatively small physical size. For example, consider an array of 100 diode lasers. That is 100 diode lasers stacked one upon another just as illustrated in FIGS. 1 to 3. A structure results which is approximately 1.5 inches long and 0.2 inches in diameter. The bulk resistance across the stack into which the pulse source operates is about 10 ohms. Such a structure is amenable to coaxial feed since the 1.5-inch length is only one-eighth of a wavelength of the high frequency component (about 1 K mc. and so reasonably well-shaped pulses of about 10 nanoseconds width may be achieved.

The thermal problems can be resolved as follows. The cylindrical stack 1.5 inches long and 0.2 inches in diameter can readily dissipate 20 watts into liquid nitrogen in which the stack is immersed during operation producing an internal temperature rise of about 50° K. This estimation of heat dissipation is very conservative and as a practical matter greater heat can be dissipated with less internal temperature rise by employing more sophisticated thermal design such as fins, etc.

A multitude of diode laser arrays such as the array illustrated in FIG. 1 are combined to provide an electrically controlled beam scanning laser system such as illustrated in FIG. 4. A multitude of the linear arrays or diode stacks 22 to 25 are arranged as shown to effectively provide a two-dimensional array of diode lasers. The active fiber bundles 26 from each of the lasers are arranged to define a two dimensional array of rows and columns at their ends 26a at the focal point of an optical system 27. In operation, each of these linear arrays 22 to 25 are pulsed in sequence. The pulses are derived from a pulse generator 28 having its output coupled directly to the linear array 22 and coupled through delay circuits 31 to 33 to the arrays 23 to 25 as shown in the figure. Each of the delay circuits 31 to 33 serve to delay the pulses the same interval. Thus, the array 23 is pulsed one interval after the array 22, the array 24 is pulsed two intervals after the array 22, and the array 25 is pulsed three intervals after the array 22. The pulses from the generator are preferably of very short duration so that as each one of the linear arrays is pulsed, the individual diode lasers which form the array are sequentially energized one after another along the length of the stack. If, for example, a typical one of the linear arrays includes 100 diodes, stacked in a structure a few inches long, the pulse rate is preferably on the order of no more than about 12 K mc. so that the interval between pulses is at least equal to the pulse propagation time through the array. In addition, it is preferred that the pulse length or duration be less than the pulse propagation time between adjacent diode lasers in the array. This, of course, insists that the pulses be very short (about 0.1 nanosecond) so that they do not straddle more than a few diode lasers in the linear array at a time. The high frequency components of such a short pulse attenuate substantially through the array and thus deteriorate the pulse. To avoid this, impedances such as 34 and 35 which are relatively high compared to the impedance across the array are coupled to the circuit at each end of an array.

As an alternative, in order to permit energization with much longer pulses and thereby avoid the problem of high frequency component attenuation, each of the arrays 22 to 25 can be constructive with electrical delays disposed in circuit between the diode lasers in the array. If, for example, 1 microsecond delays are used, the energization pulses can be a few microseconds long. These conditions are generally preferred so that the lineal arrays 22 to 25 are energized in sequence and so that the individual diode lasers in each array are energized in sequence one or a few at a time. When this is achieved, the radiation emanating from the ends of the bundles of active fibers 26 arranged in the pattern defined by their ends 26a will spatially sweep the target in a regular pattern somewhat similar to the well-known TV raster.

The structure illustrated in FIG. 4 is intended to represent only one system employing features of the invention for producing a laser beam which spatially sweeps a target in an orderly fashion, the nature of the pattern which is swept by the beam being determined by the orientation of active fiber bundles which emanate from a multitude of laser diodes and also determined by the sequence in which the diodes are energized. The structure is useful, for example, to search an area of space for the target so that echoes from the target may be detected by detecting equipment and the time coincidence of the echoes compared with the energization intervals of the diode lasers to determine position coordinates of the target in this space. This, however, is only one example of a use for the device and many others become apparent to those familiar with the art.

For some purposes it is desirable to direct intense laser radiation to a target and to switch or change the bands or band of wavelengths from instant to instant which are directed to the target in accordance with information signals thereby transmitting the information to the target. Suitable wavelength band sensitive devices such as phototubes or diode detectors together with suitable wavelength filters may be employed at the target to distinguish the different wavelength bands which are transmitted and thereby determine the information. FIG. 5 illustrates one such device, including features of the present invention for transmitting information in this manner. As illustrated in FIG. 5, a plurality 41 of different types of injection diode lasers such as diode laser 42 are arranged in an array in correspondence with an array 43 of ferrite cores such as ferrite core 44, each of the diodes being energized by electrical coupling to a different one of the cores. The cores are arranged in regular rows and columns as illustrated and they are energized in a well-known manner so that when energized, an electrical pulse is generated in the circuit coupling the core to one of the diodes and this pulse is of sufficient magnitude to energize the diode producing a brief burst of radiation which is conducted from the diode by a bundle of active fibers such as bundle 45. The bundles 45 are gathered to form a larger bundle 46 which launches radiation through a suitable optics system 47 toward a target. The active fiber bundle 45 and the manner of coupling it to the diode laser 42 is preferably of the sort already described above with reference to FIG. 3.

In operation of the system in FIG. 5, information signals such as, for example, binary numbers, are applied to the code pulse generator 48. This generator produces pulses in appropriate leads which couple to the array of cores 43 so that a selected one of the cores is energized, the energization being of sufficient magnitude to cause the particular laser diode coupled thereto to be energized. For example, if the binary value 2 were applied to the generator, electrical leads 51 and 52 would be energized. As a result, there would be a change in the magnetization of all of the cores in one row and one column of the array. However, the magnetization of only core 44 would be of sufficient magnitude to produce lasering action in the diode laser coupled thereto so as to energize the laser. Radiation at the characteristic frequency band produced by the diode laser 42 would then be directed to the target by the fiber bundle 46 and, thus, transmit information thereto corresponding to the binary number 2. This illustrates only one technique for energizing the multitude of different types of laser diodes in controlled fashion so that the wavelength can be controlled and/or switched in accordance with information signals. Obviously, more than one of the diode lasers in the array 41 may be energized at the same instant and so more than one different wavelength band of laser radiation may be directed to the target at the same instant and simultaneously detected at the target. The number of different bits of information that can be transmitted just through different combinations of wavelength bands from the array of lasers is very large. For example, if an array of 100 lasers were employed, the number of such bits is at least 10,000.

The structure in FIG. 5 can also be employed to generate a laser beam which spatially sweeps a target. For this purpose, it is required that the bundles such as 45 be arranged in a pattern such as the pattern defined by the ends 26a of active fiber bundles 26 in FIG. 4. The pattern is preferably the same as the pattern of arrangement of the ferrite cores 43 and diodes 41. In operation, the spatial sweep may be accomplished by sequentially energizing the cores in a row, one row after another. The cores in turn energize the diode lasers 41 in the same sequence and so the radiation issuing from the pattern of bundles spatially sweeps the target. This technique for producing the sweeping laser beam is more versatile than the technique shown in FIG. 4 because the sweep pattern can be varied by merely changing the sequence in which the ferrite cores are energized. For example, for any fixed two-dimensional orientation or pattern of the fiber bundles, it is possible to program the sequence of energization of the cores to produce just about any laser beam scan pattern desired. The scan pattern may be cartesian, polar or spiral, and can be changed from one to another by merely changing the program.

The structures described above accomplish beam scanning by energizing the diodes at successive intervals. This is somewhat the same as time multiplexing. One simple type of time-multiplexing sets up different channels on the same transmission path by employing different pulse codes to distinguish the different channels. For example, the spacing between pulses in pairs of pulses is different from channel to channel. This technique is sometimes called pulse multiplexing and is readily implemented employing features of the invention.

A pulse multiplexing transmission system is illustrated in FIG. 6. Included are four linear arrays or stacks of diode lasers 61 to 64. Each array is constructed substantially as described above with reference to FIG. 1. However, the arrays are pulsed at different rates or by pulse pairs with different time intervals between pulses. Thus, each array puts forth pulses of radiation with a characteristic of distinguishing interval between pulses. The bundles of active radiation conducting fibers such as bundles 65 and 66 are gathered together to form a single large bundle 67 of active fibers from which the intense laser radiation is directed by a suitable optical system 68 toward a target.

In operation, four pulsing circuits 71 to 74 which are triggered by signals from channel encoders, generate pulses at different rates or time separation and of suitable width as required for the proper energization of the associated array of diode lasers. These pulse width requirements have already been discussed above with reference to FIG. 4. Thus, in operation, all four arrays may be energized at the same time in response to information signals from the encoders in each of the four channels. As a result, pulses of radiation are launched from the single bundle 67 along a single path to the target, the pulses being a composite of the four different groups of pulses which represent the four channels. At the target, the channels are distinguished by detecting different pulse rates or spacings between pulses employing any of the techniques already well known in the art.

Figure 7:
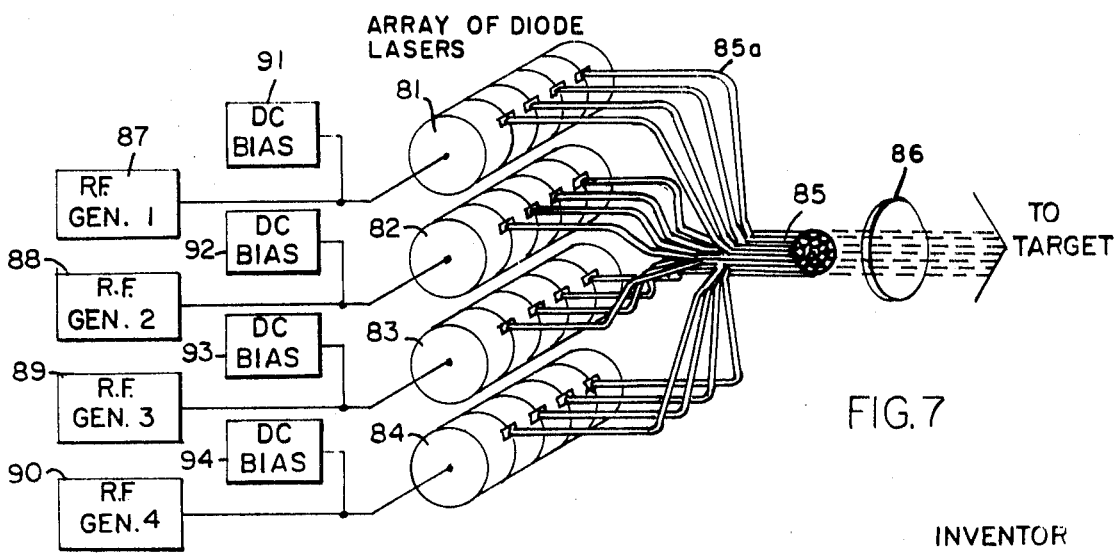
FIG. 7 illustrates a laser frequency-multiplex system in which the different channels are identified at the target by distinguishing RF modulation.

A similar embodiment to that in FIG. 6 but which incorporates the principle of frequency multiplexing is illustrated in FIG. 7. The linear arrays 81 to 84 in this case may be substantially the same as the arrays 22 to 25 in FIG. 4. However, just as in the pulse-multiplexing system of FIG. 6, the bundles of active fibers such as 85a and 85b are all gathered into a single relatively large bundle 85 from which radiation is launched toward a target and directed by an optical system 86. The difference lies in the method for energizing the arrays. As shown, each of the linear arrays 81 to 84 is energized by a different RF generator, the RF signal being imposed on a biasing signal. For this purpose, RF generators 87 to 90 operating at different frequencies are provided and the output from each generator is DC biased by a separate one of biasing circuits 91 to 94. The DC bias in each case energizes all the diodes in the associated array so that the DC bias combines with the RF signal imposed thereon to drive the diodes to laser intensity synchronized with the excursions of the RF. The wave propagation time between adjacent diodes is preferable equivalent to only a fraction of a cycle of the RF and so the diodes in any one of the arrays produce intense laser radiation at substantially the same phase interval of the associated RF.

In operation information signals from different channels modulate the different RF generators which in turn modulate the intensity of the total radiation from the linear arrays of diode lasers. Thus, information from several channels is transmitted over the same path between the large bundle 85 of active fibers and the target. The channels are distinguished at the target employing suitable band pass filters tuned to the different RF.

This completes the description of various embodiments of the present invention, all including an array or multitude of semiconductor laser devices in which lasering action occurs within a volume of the semiconductor material of very small dimensions and including a bundle of a multitude of minute radiation-conducting fibers disposed at one end of the laser device so as to intercept and conduct radiation which emanates from within the semiconductor material, the number of said fibers being substantially greater than that required to intercept all of the radiation emanating from the device so that only those fibers which conduct laser radiation can be selected and arranged in a single bundle including all active fibers for directing the combined radiation from the multitude of lasers to a target. Various embodiments of the invention, all including the above features are described to illustrate some of the uses of the invention. However, these are made only by way of example and do not limit the spirit and scope of the invention as set forth in the accompanying claims.

I claim:

1. A radiation-producing device comprising a body of semiconductor material, means for directing energy to said body of sufficient intensity to produce radiation therein, a bundle of radiation conducting tubes disposed to intercept a substantial portion of said radiation emanating from said body, said intercepted radiation being conducted by substantially less than all of said tubes, and a smaller bundle of said radiation conducting tubes including substantially only those tubes from said first-mentioned bundle which conduct said radiation, whereby substantially all of the tubes in said smaller bundle conduct radiation.

2. A radiation-producing device comprising a body of semiconductor material, means for defining an optical cavity enclosing at least a portion of said body of semiconductor material, means for directing energy to said body of semiconductor material whereby an inversion of energy states occurs in said material accompanied by the production of substantially coherent radiation by a process of simulated emission, a bundle of radiation-conducting tubes disposed with their ends adjacent said optical cavity so as to intercept substantially all of the portion of said radiation emanating from said optical cavity, said intercepted radiation being conducted by substantially less than all of said tubes, and a smaller bundle of said radiation-conducting tubes including substantially only those tubes from said first-mentioned bundle which conduct radiation from said cavity, whereby substantially all of the tubes in said smaller bundle conduct radiation.

3. A radiation-producing device comprising a body of semiconductor material, a PN junction in said body, means for defining an optical cavity enclosing at least a portion of said junction, means for directing energy to said body of semiconductor material whereby an inversion of energy states occurs in said material accompanied by the production of substantially coherent radiation at said junction by a process of stimulated emission, a bundle of radiation conducting tubes disposed with their ends adjacent said optical cavity so as to intercept substantially all of the portion of said radiation emanating from said optical cavity, said intercepted radiation being conducted by substantially less than all of said tubes, and a smaller bundle of said radiation-conducting tubes including substantially only those tubes from said first-mentioned bundle which conduct radiation from said cavity, whereby substantially all of the tubes in said smaller bundle conduct radiation.

4. A radiation-producing device comprising a multitude of separate bodies of semiconductor material, means for directing energy to each of said bodies of semiconductor material of sufficient intensity to produce radiation therein, a plurality of bundles of radiation-conducting tubes, each bundle abutting a different one of said bodies, so as to intercept a substantial portion of the radiation emanating therefrom, said intercepted radiation being conducted by substantially less than all of said tubes, a second plurality of bundles of radiation-conducting tubes, each including substantially only those tubes from among said first plurality of bundles which actively conduct radiation when the associated body of semiconductor material is energized and means for directing radiation emanating from said second plurality of bundles to a target.

5. A radiation-producing device comprising a multitude of separate bodies of semiconductor material, means for directing energy to each of said bodies of semiconductor material producing an inversion of energy states therein accompanied by the emission and amplification of radiation by the process of stimulated emission, means associated with each of said bodies of semiconductor material for defining an optical cavity, each of said cavities enclosing at least a portion of one of said bodies of said semiconductor material, a plurality of bundles of radiation-conducting tubes, each bundle abutting a different one of said cavities, so as to intercept a substantial portion of the radiation emanating therefrom, said intercepted radiation being conducted by substantially less than all of said tubes, a second plurality of bundles of radiation-conducting tubes, each including substantially only those tubes from among said first plurality of bundles which actively conduct radiation when the associated body of semiconductor material is energized and means for directing radiation emanating from said second plurality of bundles to a target.

6. A radiation-producing device comprising a multitude of separate PN junction in semiconductor material, means for directing energy to each of said junctions producing an inversion of energy states therein accompanied by the emission and amplification of radiation at said junction by the process of stimulated emission, means associated with each of said junctions for defining an optical cavity, each of said cavities enclosing at least a portion of said junction, a plurality of bundles of radiation-conducting tubes, each bundle abutting a different one of said cavities, so as to intercept a substantial portion of the radiation emanating therefrom, said intercepted radiation being conducted by substantially less than all of said tubes, a second plurality of bundles of light-conducting tubes, each including substantially only those tubes from among said first plurality of bundles which actively conduct radiation when the associated body of semiconductor material is energized and means for directing radiation emanating from said second plurality of bundles to a target.

7. A device for producing a spatially scanning beam or radiation comprising a plurality of semiconductor laser devices, a plurality of separate bundles of radiation-conducting tubes each associated with a different one of said semiconductor laser devices and arranged in an orderly relationship, means for energizing said plurality of devices in a predetermined sequence and an optical system for intercepting and directing radiation emanating from the ends of said bundles of light-conducting tubes, the order of energization of said radiation-producing devices, the arrangement of said ends of said bundles of tubes and the positions of the ends of said bundles in said optical system being such that a beam of radiation is directed from said optical system to sweep an area of space in a predetermined manner.

8. A device for producing a spatially scanning laser beam comprising a plurality of semiconductor laser devices, a plurality of separate bundles of radiation-conducting tubes each associated with a different one of said semiconductor laser devices and each formed from a larger such bundle by selection of active tubes therein, said plurality of separate bundles being arranged in an orderly relationship, means for energizing said plurality of semiconductor laser devices in a predetermined sequence and an optical system for intercepting and directing radiation emanating from the ends of said bundles of radiation-conducting tubes, the order of energization of said semiconductor laser devices, the arrangement of said ends of said bundles of tubes and the positions of the ends of said bundles in said optical system being such that a beam of laser radiation is directed from said optical system to sweep an area of space in a predetermined manner.

9. A device for producing a spatially scanning laser beam comprising a plurality of semiconductor laser devices, a plurality of separate bundles of radiation-conducting tubes each associated with a different one of said semiconductor laser devices and each formed from a larger such bundle by selection of active tubes therein, said plurality of separate bundles being arranged in an orderly series of rows and columns, means for energizing said plurality of semiconductor laser devices in a predetermined sequence row after row down a column and an optical system for intercepting and directing radiation emanating from the ends of said bundles of radiation conducting tubes to a target, whereby a beam of laser radiation is directed from said optical system to sweep said target in a regular manner.

10. A device for producing a wavelength-multiplexed laser beam and directing said beam to a target comprising a plurality of semiconductor laser device, means for energizing each of said laser devices, said laser devices being of different kinds producing different wavelength bands of radiation when energized, a separate bundle of radiation conducting tubes optically coupled to each of said semiconductor laser devices, one end of said bundles of light-conducting tubes being arranged in a relatively larger bundle, means for controlling the sequence of energization of said laser devices in response to information signals so that combinations of said wavelength bands in the radiation emanating from said relatively large bundle of radiation conducting tubes is indicative of said information.

11. A device for producing a wavelength-multiplexed laser beam and directing said beam to a target comprising a plurality of binary energizing devices, separate semiconductor laser device coupled to each of said binary devices, said laser devices being of different kinds producing different wavelength bands of radiation when energized and a separate bundle of radiation-conducting tubes, optically coupled to each of said semiconductor laser devices, one end of said bundles of radiation-conducting tubes being arranged to form a relatively large single bundle, means for controlling said binary devices in response to information signals so that said different semiconductor laser devices are energized producing combinations of said wavelength bands in the radiation emanating from said relatively large bundle of radiation conducting tubes which is indicative of said information.

12. A device producing a wavelength-multiplexed laser beam and directing said beam to a target, comprising an orderly array of ferrite cores, a separate semiconductor laser device coupled to each of said cores, said laser devices being of different kinds producing different frequency bands of radiation when energized and a separate bundle of radiation conducting tubes optically coupled to each of said semiconductor laser devices, one end of said bundles of radiation-conducting tubes being arranged to form a relatively large bundle, means for energizing said ferrite cores in response to information signals so that the wavelength bands of radiation emanating from said relatively large bundle of radiation conducting tubes are indicative of said information.

13. A device for producing a multiplexed laser beam comprising a plurality of semiconductor laser devices, a plurality of bundles of radiation-conducting tubes each optically coupled at one end with a different one of said laser devices, the other ends of said bundles being formed into a single bundle of radiation-conducting tubes, a plurality of different communication channels, each coupled to a different group of said laser devices for energizing said devices, means in each of said channels for generating information signals, means in each of said channels for energizing the associated group of laser devices in a manner characteristic of said channel, signals from different channels, a means for detecting radiation which issues from said single bundle and means associated with said detecting means for distinguishing said characteristic manners of energization, thereby distinguishing said different information channels.

14. A device for producing a pulse-multiplexed laser beam comprising a plurality of semiconductor laser devices, a plurality of bundles of radiation-conducting tubes each optically coupled at one end with a different one of said laser devices, the other ends of said bundles being formed into a single bundle of radiation conducting tubes, means for energizing different groups of said laser devices by different pulse trains in response to information signals from different channels, means for detecting radiation which issues from said single bundle and means associated with said detecting means for distinguishing said different pulse trains thereby distinguishing said different information channels.

15. A device for producing a frequency-multiplexed laser beam comprising a plurality of semiconductor laser devices, a plurality of bundles of radiation-conducting tubes each optically coupled at one end with a different one of said laser devices, the other ends of said bundles being formed into a single bundle of radiation conducting tubes, means for energizing said laser devices, means for modulating the energization of different groups of said laser devices at different frequencies in response to information signals from different channels, means for detecting radiation which issues from said single bundle and means associated with said detecting means for distinguishing said different frequencies thereby distinguishing said different information channels.

16. A device for producing a spatially scanning laser beam comprising a plurality of semiconductor laser devices, a plurality of separate bundles of radiation-conducting tubes each bundle having one end optically coupled with a different one of said semiconductor laser devices, the other ends of said bundles being arranged in an orderly array, a plurality of ferrite cores, means coupling each of said ferrite cores to a different one of said semiconductor laser devices for energizing said laser devices and means for energizing said ferrite cores, whereby laser radiation from said laser devices is conducted by said bundles of radiation conducting tubes and launched from said other ends into space spatially scanning an area thereof.